(12) United States Patent
Kanda et al.

(10) Patent No.: US 8,678,505 B2
(45) Date of Patent: Mar. 25, 2014

(54) SEAT CUSHION OF VEHICLE SEAT

(75) Inventors: Kenji Kanda, Tokyo (JP); Masaaki Honda, Tokyo (JP); Yosuke Karino, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 521 days.

(21) Appl. No.: 12/975,205

(22) Filed: Dec. 21, 2010

(65) Prior Publication Data
US 2012/0153702 A1 Jun. 21, 2012

(51) Int. Cl.
*A47C 7/02* (2006.01)
(52) U.S. Cl.
USPC ............ 297/452.15; 297/452.55; 297/452.56; 297/452.23
(58) Field of Classification Search
USPC .............. 297/452.15, 452.55, 452.56, 452.23
See application file for complete search history.

(56) References Cited

U.S. PATENT DOCUMENTS

| | | | | |
|---|---|---|---|---|
| 2,158,929 | A * | 5/1939 | Dunajeff | 428/596 |
| 2,233,592 | A * | 3/1941 | Dunajeff | 428/604 |
| 4,418,958 | A * | 12/1983 | Watkin | 297/452.15 |
| 4,660,887 | A * | 4/1987 | Fleming et al. | 297/448.2 |
| 4,712,834 | A * | 12/1987 | Warrick | 297/284.2 |
| 4,892,356 | A * | 1/1990 | Pittman et al. | 297/452.15 |
| 4,962,964 | A * | 10/1990 | Snodgrass | 297/452.15 |
| 5,067,772 | A * | 11/1991 | Koa | 297/452.55 |
| 5,154,485 | A * | 10/1992 | Fleishman | 297/446.1 |
| 6,082,824 | A * | 7/2000 | Chow | 297/452.56 |
| 6,446,945 | B1 * | 9/2002 | Wisniewski | 267/131 |
| 6,626,497 | B2 * | 9/2003 | Nagamitsu et al. | 297/452.15 |
| 6,663,178 | B2 * | 12/2003 | Fourrey et al. | 297/284.3 |
| 6,908,159 | B2 * | 6/2005 | Prince et al. | 297/452.23 |
| 7,032,971 | B2 * | 4/2006 | Williams | 297/284.4 |
| 7,654,617 | B2 * | 2/2010 | Farnsworth | 297/452.56 |
| 7,686,395 | B2 * | 3/2010 | Piretti | 297/297 |
| 7,971,935 | B2 * | 7/2011 | Saez et al. | 297/285 |
| 8,042,873 | B2 * | 10/2011 | Miyamaru et al. | 297/452.21 |
| 8,172,326 | B2 * | 5/2012 | Adragna et al. | 297/344.17 |
| 2009/0020931 | A1 * | 1/2009 | Coffield et al. | 267/142 |

FOREIGN PATENT DOCUMENTS

| | | | | |
|---|---|---|---|---|
| GB | 2143125 A | * | 2/1985 | ............... A47C 7/16 |
| JP | 2005237519 A | | 9/2005 | |
| JP | 2007099195 A | | 4/2007 | |

* cited by examiner

*Primary Examiner* — Laurie Cranmer
(74) *Attorney, Agent, or Firm* — Browdy and Neimark, PLLC

(57) ABSTRACT

A seat cushion of vehicle seat including a seat cushion frame and a bottom panel member on which a foam padding is mounted. The bottom panel member has a thigh support area fixed to a forward portion of the seat cushion frame and a buttocks support area situated in a rearward portion of the seat cushion frame. The buttocks support area has a resiliently deformable area in which are formed beads, each being resiliently stretchable laterally relative to the central line thereof by a downward load applied to the buttocks support area, whereby the resiliently deformable area is rendered deformable and displaceable downwardly. The buttocks support area may be made narrow by forming two inwardly curved edge portions in the respective sides thereof to thereby allow that buttocks support area to be warped downwardly. Hence, the buttocks support area is resiliently displaceable vertically relative to the seat cushion frame.

20 Claims, 2 Drawing Sheets

SEAT CUSHION OF VEHICLE SEAT

BACKGROUND OF THE INVENTION

1. Field of the Invention

The present invention relates to a seat cushion of a vehicle seat. Specifically, the invention is directed to a seat cushion of the type comprising a seat cushion frame and a bottom panel member substantially underlaying the seat cushion frame, with the ends of the bottom panel member being connected with frame members of the seat cushion frame.

2. Description of Prior Art

In general, a vehicle seat is basically composed of a seat cushion for supporting a buttocks and thigh portions of seat occupant and a seat back for supporting a back portion of the seat occupant. With regard to the seat cushion in particular, among various seat cushions, there has been known a seat cushion of the type having a bottom panel member provided in the bottom side thereof, the bottom panel member being mainly adapted for supporting a foam padding thereon. More specifically, the seat cushion of this type basically comprises a seat cushion frame and a bottom panel member, such that the bottom panel member is disposed in a space surrounded by frame members of the seat cushion frame so as to be situated underside of the seat cushion frame, with the peripheral ends of the bottom panel member being connected to the frame members.

In some of the seat cushions of this kind, the peripheral ends of the bottom panel member are fixedly attached by welding to the seat cushion frame. On the other hand, there are some seat cushions wherein the peripheral ends of the bottom panel member are connected by springs to the seat cushion frame, such that the bottom panel member is resiliently suspended from the seat cushion frame, which is for example disclosed from the Japanese Laid-Open Patent Publication No. 2007-99195 or JP 2007-99195 A1. Further, in some other seat cushions of this kind, a bottom panel member used is made of a spring material, and therefore, a whole of the bottom panel member itself is elastic and prone to resilient deformation, as disclosed from the Japanese Laid-Open Patent Publication No. 2005-237519 or JP 2005-237519 A1 for instance.

However, the above-described conventional seat cushions have been with their own inevitable problems, which are set forth as follows:

(i) In the case of the seat cushion having the bottom panel member welded to the seat cushion frame thereof, the cushiony effect of the seat cushion is insufficient due to the rigid formation of the bottom panel member, thus requiring an increased thickness of a foam padding mounted on the bottom panel member to attain a satisfied cushiony effect of the seat cushion. Consequently, such increased thickness of foam padding results in the seat being correspondingly increased in size and therefore makes narrow a space of vehicle in which the seat is disposed.

(ii) In the case of the seat cushion (e.g. JP 2007-99195 A1) wherein a bottom panel member is connected by springs to a seat cushion frame, the construction of the seat cushion is rather complicated and requires a great number of parts and many steps of assembly for forming the seat cushion. This is apparently time-consuming and undesired increase of costs involved.

(iii) As for the seat cushion (e.g. JP 2005-237519 A1), the bottom panel member itself is made of spring material and the entirety thereof is resiliently deformable, which undesirably gives a cushiony effect even to the areas of seat cushion that do not require any cushiony and resilient touch, such as an area of seat cushion for supporting thigh portions of seat occupant thereon, for instance.

SUMMARY OF THE INVENTION

In view of the above-stated drawbacks, it is a primary purpose of the present invention to provide an improved seat cushion which gives an optimum cushiony effect to a buttocks portion of seat occupant, while stably supporting thigh portions of the seat occupant, and further permits for reducing a thickness of foam padding.

In order to achieve such purpose, a seat cushion of vehicle seat in accordance with the present invention is basically comprised of;

a seat cushion frame including: a first lateral frame member having: a forward frame portion defined forwardly of the seat cushion; and a rearward frame portion defined rearwardly of the seat cushion; and a second lateral frame member having: a forward frame portion defined forwardly of the seat cushion; and a rearward frame portion defined rearwardly of the seat cushion, wherein the first and second lateral frame members are spaced apart from each other; and a bottom panel member upon which a foam padding is to be mounted, the bottom panel member being so formed as to have: a thigh support area defined in a forward portion of the bottom panel member which faces forwardly of the seat cushion, the thigh support area being adapted to support thigh portions of a seat occupant who is to sit on the seat cushion, and being fixedly welded to the forward portion of the first lateral frame member and the forward portion of the second lateral frame members; a buttocks support area defined in a rearward portion of the bottom panel member which faces rearwardly of the seat cushion, the buttocks support area being adapted to support a buttocks portion of the seat occupant; and a rearward end area formed continuously from the buttocks support area, the rearward end area being fixedly connected with the rearward portion of the first lateral frame member and the rearward portion of second lateral frame members, wherein the buttocks support area is disposed between the rearward portion of the first lateral frame member and the rearward portion of the second lateral frame member, and further has a deformable area defined therein, the deformable area being provided with a bead element integrally therein to thereby allow the deformable area per se to be resiliently deformable and displaceable vertically relative to the seat cushion frame.

Preferably, the resiliently deformable area may be formed with a hole in substantially the center thereof.

As one aspect of the present invention, the bead element may comprise a pair of beads, each having, defined therein, a first bead portion and a second bead portion, such that the two first bead portions respectively of the pair of beads extend along a direction forwardly and rearwardly of the seat cushion frame, whereas the two second bead portions respectively of the pair of beads extend away from each other in a direction rearwardly of the seat cushion frame.

Preferably, the afore-the hole may be disposed between those second bead portions.

Preferably, the bead element may comprise: a substantially U-shaped first bead of substantially "U" shape in cross-section, thus having a downward recession which opens outwardly in an upwardly facing surface of the bottom panel member; and a pair of spaced-apart second beads, each being of substantially "inverted U" shape in cross-section, thus having an upward recession which opens outwardly in a downwardly facing surface of the bottom panel member, the substantially U-shaped first bead being defined in the buttocks support area, such that the resiliently deformable area is substantially surrounded by the substantially U-shaped first bead, Preferably, a pair of inwardly curved edge portions may be defined in two lateral sides of buttocks support area, respectively, at a point where the resiliently deformable area lies, so that the buttocks support area becomes narrow at the point.

Other various features and advantages will become apparent from reading of the description, hereinafter, with reference to the accompanied drawings.

DETAILED DESCRIPTION OF PREFERRED EMBODIMENT OF THE INVENTION

Referring to FIGS. 1 to 4, there is illustrated a preferred embodiment of seat cushion of vehicle seat in accordance with the present invention, wherein the seat cushion is generally designated by (SC). In this regard, the shown structure of seat cushion (SC) is merely comprised of a seat cushion frame (CF) and a bottom panel member (1), but, it is to be understood that those seat cushion frame (CF) and bottom panel member (1) are normally covered with an upholstery such as a foam padding (see the designation P in FIG. 3) and a trim cover assembly, hence assuming an ordinary outer appearance of seat cushion as well known in the art. Therefore, a specific description will be made only of the shown structure of seat cushion (SC) for clarity purpose.

It is to be noted that, hereinafter, the wording "forward" or "forwardly" refers to a forward side (FW) facing forwardly of the seat cushion (SC), whereas the wording "rearward" or "rearwardly" refers to a rearward side (BW) facing rearwardly of the seat cushion (SC).

According to the illustrated seat cushion (SC), a substantially U-shaped seat cushion frame (CF) is provided, which is shown as having: a forward cross frame portion (3); and a pair of lateral frame portions (2) and (2) continuously extending from the forward cross frame portion (3) along the forward and rearward directions of seat cushion. Disposed inwardly of such seat cushion frame (CF) is a bottom panel member (1), a main constituent part of the present invention, which is, in brief, fixedly connected at the peripheral ends thereof with the seat cushion frame (CF).

The bottom panel member (1) is made of a metallic plate material having a certain resilient property, with the thickness thereof being preferably approx. 0.8 mm for example. In practical assembly, such metallic plate material is subjected to a stamping process to assume the illustrated three-dimensional configuration.

Figure 1:
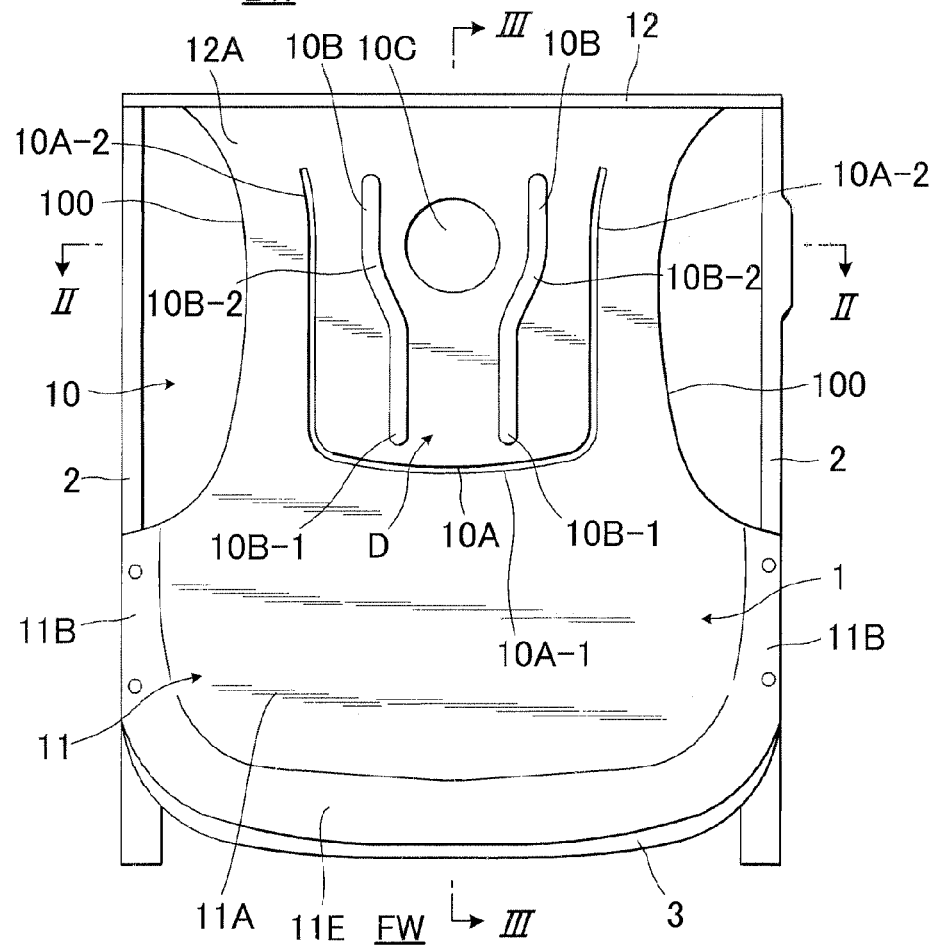
FIG. 1 is a partly broken perspective view showing a seat in accordance with the present invention.

As shown in FIG. 1, roughly stated, the bottom panel member (1) is basically so formed to have the undermentioned areas:

(a) a thigh support area (11) fixedly attached to a forward portion of the seat cushion frame (CF);

(b) a buttocks support area (10) defined in substantially a rearward half of the seat cushion frame (CF);

(c) a pair of inwardly curved edge portions (100) and (100) defined on the opposite sides of the afore-said buttocks support area; and (d) a rearward end area (12) extending upwardly from the buttocks support area (10) and being connected between the two rearward end portions respectively of the two lateral frame members (2) and (2) of seat cushion frame (CF). Specifically, the thigh support area (11) is adapted for supporting thigh portions of a seat occupant thereon, and as commonly known in the art, the thigh support area (11) is required to be rigid and not deformable vertically, so that the thigh portions of seat occupant are stably supported thereon. Therefore, the thigh support area (11) is only a rigid unitary area of the bottom plate member (1), which has, defined therein, a gently sloped main region (11A) and a substantially U-shaped peripheral end portion surrounding that main region (11A), wherein the substantially U-shaped peripheral end portion is welded to and along substantially a forward half of the seat cushion frame (CF). In this regard, as seen in FIG. 1, such substantially U-shaped peripheral end portion of thigh support area (11) is divided into: a forward end region (11E) firmly welded to the forward cross frame member (3); and a pair of lateral end regions (11B) and (11B) which are respectively firmly welded to the two forward end regions respective of the two lateral frame members (2) and (2). With those rigid unitary main region (11A) and fixation of the three end regions (11B, 11B and 11E), regardless of the bottom panel member (1) being resilient, a whole of the thigh support area (11) is in no way deformable and maintains its original shape, thus providing a stationary condition for the seat occupant's thigh portions to be stably rested thereon.

Figure 4:
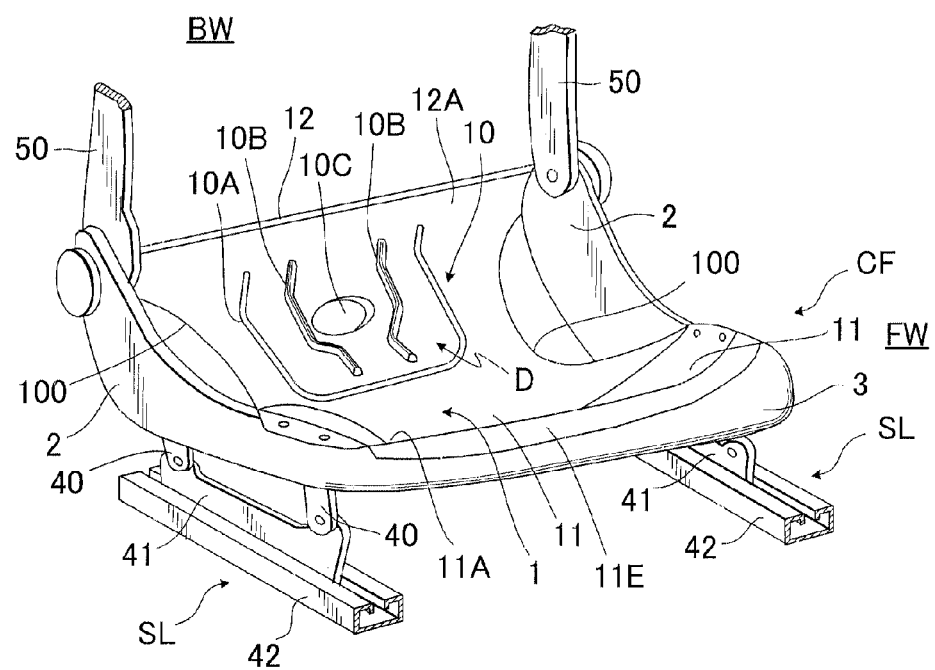
FIG. 4 is a partly broken fragmentary sectional view of the principal parts of the invention.

On the other hand, the buttocks support area (10) is adapted for supporting a buttock portion of seat occupant thereon and defined in substantially a rearward half of the bottom panel member (1). This buttocks support area (10) is formed narrower than the afore-said thigh support area (11) by cutting out the corresponding two lateral areas of bottom panel member (1) curvilinearly so as to define a pair of spaced-apart curved edge portions (100) and (100) in the respective two lateral edges of the buttocks support area (10). In FIGS. 1 and 4, the two curved edge portions (100) are depicted as extending from the foregoing thigh support area (11) and terminating at the rear end region (12) in such a fashion as to be curved inwardly of the bottom panel member (1) in a direction toward each other. Hence, such two inwardly curved edge portions (100) are disposed symmetrically relative to the buttocks support area (10), whereby the buttocks support area (10) in turn becomes narrower as it proceeds towards the center thereof. It is to be seen that, due to such formation of two inwardly curved edge portions (100), the buttocks support area (10) is spaced apart from both two lateral frame members (2), without any continuous transit portion therebetween. Hence, the buttocks support area (10) is situated independently of those two lateral frame members (2), thereby attaining a freedom of resilient deformation of the buttocks support area (10) per se with respect to the seat cushion frame (CF). Also, the two inwardly curved edge portions (100) are effective in allowing the buttocks support area (10) to be warped downwardly in conjunction with a hole (100) and beads (10A and 10B), which plays an important role, as will be described later.

Further, defined in the foregoing buttocks support area (10) is a resiliently deformable region (D) having the undermentioned elements formed integrally therein.

(a) a substantially U-shaped first bead (10A) which surrounds and defines a working range of the downwardly deformable resilient region (D);

(b) a pair of spaced-apart second beads (10B) and (10B) disposed inwardly of the foregoing first bead (10A); and (c) a hole (10C) disposed inwardly of those two second beads (10B)

As shown in FIG. 1, more specifically, the first bead (10A) is formed in the buttocks support area (10), such that the horizontal bead portion (10A-1) thereof is situated in the vicinity of a boundary between the buttocks support area (10) and thigh support area (11) and extends in a direction transversely of the seat cushion frame (CF), whereas the two vertical bead portions (10A-2) (10A-2) thereof extend in the vicinity of the two curved edge portions (100) (100), respectively, in the fore-and-aft direction. In this respect, in other words, such two vertical bead portions (10A-2) extend along the forward and rearward directions of the seat cushion frame (CF), with both two ends respective thereof extending towards the substantially upturned rearward end region (12) and terminating thereat. In that way, the contour of the first bead (10A) is defined, which in turn substantially defines an entire working range of the resiliently deformable area (D) and serves to reinforce the periphery of that resilinetly deformable area (D) as well.

Figure 2:
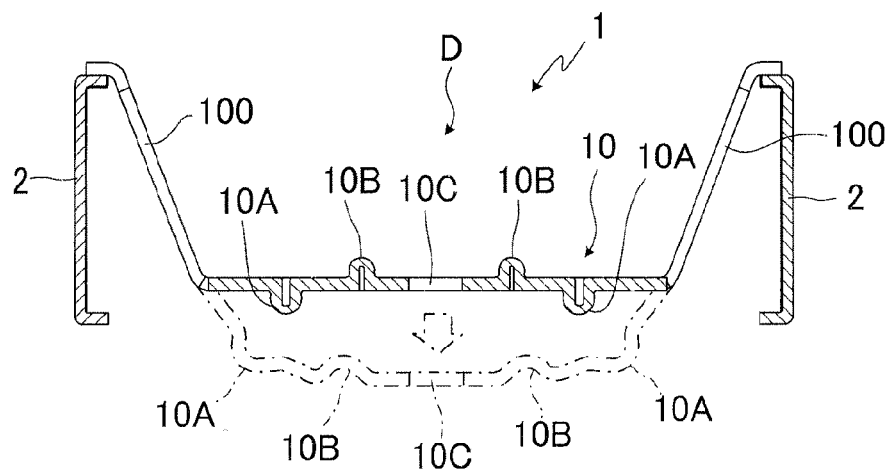
FIG. 2 is a partly broken perspective view showing a principal part of the seat in accordance with the invention.

As best viewed from FIG. 2, the first bead (10A) is of a substantially "inverted U" shape in cross-section, thus having a downward recession defined therein and therealong, and it is therefore seen that such downward recession opens outwardly in the upper surface or upwardly facing surface of the bottom panel member (1).

On the other hand, the pair of second beads (10B and 10B) are depicted in FIG. 1 to be situated inwardly of the afore-said first bead (10A) and extend along the forward and rearward directions of seat cushion frame (CF) in substantially a parallel relation with the respective two vertical bead portions (10A-2 and 10A-2) of the first bead (10A). More specifically, those two second beads (10B) extend in a spaced-apart relation with each other, such that the two forward bead portions (10B-1) and (10B-1) respectively thereof extend rectilinearly, while on the other hand, the two rearward bead portions (10B-2) and (10B-2) respectively thereof become divergent or extend outwardly away from each other as they proceed rearwardly toward the rearward end region (12). It is noted here that the hole (100) is situated between such rearwardly diverging two bead portions (10B-2 and 10B-2).

As best viewed from FIG. 2, each of the two second beads (10B) is of a substantially "inverted U" shape in cross-section, as opposed to the first bead (10A), thus having an upward recession defined therein and therealong. Therefore, such upward recession opens outwardly in the reverse surface or downwardly facing surface of bottom panel member (1).

Figure 3:
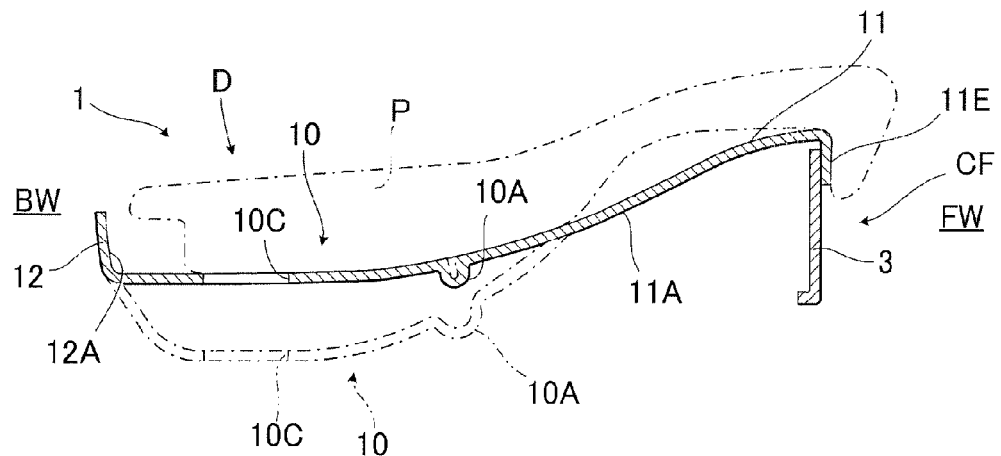
FIG. 3 is a partly broken and enlarged perspective view of the seat, which specifically showing one principal part provided to the left-side portion of the seat and another principal part provided to the right-side portion of the seat.

As indicated by the one-dot chain lines in FIG. 3, normally, a foam padding (P) is mounted on the bottom panel member (1), as known in the art, and further, while not shown, the seat cushion frame (CF) as well as the foam padding (P) are properly covered with a trim cover assembly to form a certain outer appearance of seat cushion.

As constructed above, when a seat occupant sits on the above-constructed seat cushion, his or her thigh portions are rested upon the forward portion of seat cushion in which there lies the rigid thigh support area (11) of bottom panel member (1), whereby the thigh portions are stably supported by the thigh support area (11) via the foam padding (P). And, the seat occupant's buttocks portion is rested on the rearward portion of seat cushion in which there lies the buttocks support area (10) of bottom panel member (1).

At this moment, referring to FIGS. 2 and 3, it is to be seen that, as most of load is applied from the seat occupant buttocks portion in downward direction, the buttocks support area (10), upon receiving the load, is resiliently warped downwards due to the provision of the two inwardly curved portions (100 and 100) that have been explained above, while at the same time, as indicated by the arrow in FIG. 2, the resiliently deformable area (D) is quickly subjected to downward deformation by the reason of the following facts: (i) the first bead (10A) is forcibly stretched in the lateral direction and thus resiliently widened leftwise and rightwise relative to the central line thereof, thereby causing the upward recession of that first bead (10A) to open wide temporarily, as indicated by the one-dot chain lines in FIGS. 2 and 3, and (ii) simultaneously therewith, each of the two second beads (10B and 10B) is also forcibly stretched in the lateral direction and thus resiliently widened leftwise and right wise relative to the central line thereof, thereby causing the downward recession of the second bead (10B) to open wide temporarily, as indicated by the one-dot chain lines in FIG. 2.

With the foregoing lateral resilient extension of all the first and second beads (10A and 10B), the entirety of the resiliently deformable area (D) is resiliently deformed and warped downwardly in a direction to the hole (10C) and therefore displaced in the downward direction as indicated by the arrow in FIG. 2. Here, it is important to note that, by virtue of the hole (10C) disposed at substantially a center of the resiliently deformable area (D), the above-explained load, causing the abovementioned extension of first and second beads (10A and 10B), is smoothly and intensively directed to that hole (100) in the downward direction, whereby, along with such load, the resiliently deformable area (D) as well as the buttocks support area (10) are quickly deformed or warped downwardly, with concurrent smooth lateral extension of both first and second beads (10A and 10B), in a direction towards the hole (10C). Hence, the provision of the hole (100) in effect assists in downward resilient deformation of both above-mentioned two areas (D and 10).

Of course, each of the two beads (10A and 10B) attempts to resiliently recover its original shape to thereby set back the above-described opened recessions thereof into a normal form of recession, so that the resiliently deformable area (D) is resiliently returned upwards to a normal position shown by the solid lines, while at the same time, a whole of the buttocks support area (10) is caused by such resilient recovery of resiliently deformable area (D) to return to a normal position shown by the solid lines, in conjunction with the above-explained effect of the two inwardly curved edge portions (100).

Accordingly, a whole of the foregoing two areas (D and 10) are resiliently displaceable in the vertical direction with respect to the seat cushion frame (CF), giving a cushioning performance in the bottom of seat cushion, and further cooperates with the elasticity of the foam padding (P) to provide a satisfied cushiony effect to the buttocks portion of seat occupant. On the other hand, the thigh portions of the seat occupant are stably supported by the rigid thigh support area (11) without being moved vertically, while only a slight elastic touch of the foam padding (P) is given to the thigh portions.

In accordance with the present invention, a seat cushion with the above-described improved unique arrangement is provided with an optimum cushiony effect, so that a seat occupant can enjoy a comfortable seating touch on the seat cushion. Further, due to the provision of resiliently deformable area (D), the foam padding (P) mounted thereon does not require a large thickness that is required for the conventional rigid bottom plate member, which in turn allows the thickness of foam padding (P) to be reduced to a smallest possible size, taking into account the degree of deformability of a whole of the buttocks support area (10) inclusive of that area (D). This advantage of the present invention not only allows the seat cushion to be decreased in height to thereby widen a cabin space of vehicle, but also decrease costs for forming the seat cushion.

While having described the present invention thus far, it is to be understood that the invention is not limited to the illustrated embodiment, but any modification, addition and replacement may be applied thereto, without departing from the scopes of the appended claims.

What is claimed is:

1. A seat cushion of a vehicle seat, comprising:
    a seat cushion frame including:
        a first lateral frame member having: a forward frame portion defined forwardly of the seat cushion; and a rearward frame portion defined rearwardly of the seat cushion; and
        a second lateral frame member having: a forward frame portion defined forwardly of the seat cushion; and a rearward frame portion defined rearwardly of the seat cushion,
    wherein said first and second lateral frame members are spaced apart from each other; and a bottom panel member upon which a foam padding is to be mounted, said bottom panel member having peripheral end portions fixedly welded to said seat cushion frame and being so formed as to have:
        a) a thigh support area defined in a forward portion of said bottom panel member which is forward of the seat cushion, said thigh support area being adapted to support thigh portions of a seat occupant who is to sit on the seat cushion, and being fixedly welded to said forward frame portion of said first lateral frame member and said forward frame portion of said second lateral frame member;
        b) a buttocks support area defined in a rearward portion of said bottom panel member which is rearward of the seat cushion, said buttocks support area being adapted to support a buttocks portion of said seat occupant; and
        c) a rearward end area formed continuously from said buttocks support area, said rearward end area being fixedly connected with said rearward frame portion of said first lateral frame member and said rearward frame portion of said second lateral frame member,
    wherein said buttocks support area is disposed among said rearward frame portion of said first lateral frame member, said rearward frame portion of said second lateral frame member and said thigh support area,
    wherein said buttocks support area has a resiliently deformable area defined therein, said resiliently deformable area having a center therein,
    wherein a plurality of beads are defined in said resiliently deformable area, said plurality of beads including a first set of bead portions and a second set of bead portions, and
    wherein said first and second sets of bead portions are disposed on opposite sides of said center of the resiliently deformable area and extend in a direction forwardly and rearwardly of said seat cushion frame, thereby allowing the resiliently deformable area to be resiliently deformable and displaceable vertically, via said first and second sets of bead portions, relative to said seat cushion frame.

2. The seat cushion as claimed in claim 1, wherein said plurality of beads further include a bead portion extending between said first set of bead portions in a direction transversely of said seat cushion frame.

3. The seat cushion as claimed in claim 1, wherein said resiliently deformable area further includes a hole formed in substantially said center thereof, and wherein said first sets of bead portions as well as said second sets of bead portions are disposed on the opposite sides of said hole.

4. The seat cushion as claimed in claim 1,
    wherein said bottom panel member has an upwardly facing surface and a downwardly facing surface opposite to said upwardly facing surface,
    wherein said first sets of bead portions are each of a substantially U-shape in cross-section, thus having a downward recession which opens outwardly in said upwardly facing surface of said bottom panel member, and
    wherein said second sets of bead portions are each of substantially "inverted U" shape in cross-section, thus having an upward recession which opens outwardly in said downwardly facing surface of said bottom panel member.

5. The seat cushion as claimed in claim 1,
    wherein said bottom panel member has an upwardly facing surface and a downwardly facing surface opposite to said upwardly facing surface,
    wherein said first sets of bead portions are each of a substantially U-shape in cross-section, thus having a downward recession which opens outwardly in said upwardly facing surface of said bottom panel member,
    wherein said second sets of bead portions are each of substantially "inverted U" shape in cross-section, thus having an upward recession which opens outwardly in said downwardly facing surface of said bottom panel member, and
    wherein said resiliently deformable area is substantially surrounded by said first and second sets of bead portions in relation to the center thereof.

6. The seat cushion according to claim 5, wherein said resiliently deformable area further includes a hole formed in substantially said center thereof, and wherein said first sets of bead portions as well as said second sets of bead portions are disposed on the opposite sides of said hole.

7. The seat cushion as claimed in claim 1, wherein said bottom panel member has an upwardly facing surface and a downwardly facing surface opposite to said upwardly facing surface, wherein said first sets of bead portions (at 10A-2) are each of a substantially U-shape in cross-section, thus having a downward recession which opens outwardly in said upwardly facing surface of said bottom panel member, wherein said second sets of bead portions are each of substantially "inverted U" shape in cross-section, thus having an upward recession which opens outwardly in said downwardly facing surface of said bottom panel member, wherein said resiliently deformable area is substantially surrounded by said first and second sets of bead portions in relation to the center thereof, and wherein said plurality of beads further include a bead portion between said first set of bead portions in a direction transversely of said seat cushion frame, said bead portion being of a substantially U-shape in cross-section, thus having a downward recession which opens outwardly in said upwardly facing surface of said bottom panel member.

8. The seat cushion according to claim 7, wherein said resiliently deformable area further includes a hole formed in substantially said center thereof, and wherein said first sets of bead portions as well as said second sets of bead portions are disposed on the opposite sides of said hole.

9. The seat cushion as claimed in claim 1, wherein a pair of inwardly curved edge portions are defined in two lateral sides of said buttocks support area, respectively, at a point where said resiliently deformable area lies, such that said buttocks support area becomes narrow at said point.

10. The seat cushion as claimed in claim 1, wherein said bottom panel member has an upwardly facing surface and a downwardly facing surface opposite to said upwardly facing surface, wherein said first sets of bead portions are each of a substantially U-shape in cross-section, thus having a downward recession which opens outwardly in said upwardly facing surface of said bottom panel member, wherein said second sets of bead portions are each of substantially "inverted U" shape in cross-section, thus having an upward recession which opens outwardly in said downwardly facing surface of said bottom panel member, wherein said resiliently deformable area is substantially surrounded by said first and second sets of bead portions in relation to the center thereof, and wherein said plurality of beads further include a bead portion between said first set of bead portions in a direction transversely of said seat cushion frame, said bead portion being of a substantially U-shape in cross-section, thus having a downward recession which opens outwardly in said upwardly facing surface of said bottom panel member.

11. The seat cushion according to claim 10, wherein said resiliently deformable area further includes a hole formed in substantially said center thereof, and wherein said first sets of bead portions as well as said second sets of bead portions are disposed on the opposite sides of said hole.

12. A seat cushion of vehicle seat, comprising:
  a seat cushion frame including:
    a first lateral frame member having: a forward frame portion defined forwardly of the seat cushion; and a rearward frame portion defined rearwardly of the seat cushion; and
    a second lateral frame member having: a forward frame portion defined forwardly of the seat cushion; and a rearward frame portion defined rearwardly of the seat cushion,
    wherein said first and second lateral frame members are spaced apart from each other; and
  a bottom panel member upon which a foam padding is to be mounted, said bottom panel member being so formed as to have:
    a) a thigh support area defined in a forward portion of said bottom panel member which is forward of the seat cushion, said thigh support area being adapted to support thigh portions of a seat occupant who is to sit on the seat cushion, and being fixedly welded to said forward frame portion of said first lateral frame member and said forward frame portion of said second lateral frame member;
    b) a buttocks support area defined in a rearward portion of said bottom panel member which is rearward of the seat cushion, said buttocks support area being adapted to support a buttocks portion of said seat occupant; and
    c) a rearward end area formed continuously from said buttocks support area, said rearward end area being fixedly connected with said rearward frame portion of said first lateral frame member and said rearward frame portion of said second lateral frame member,
  wherein said buttocks support area is disposed among said rearward frame portion of said first lateral frame member, said rearward frame portion of said second lateral frame member, and said thigh support area,
  wherein said buttocks support area has a resiliently deformable area defined therein, said resiliently deformable area having a center therein,
  wherein a plurality of beads are defined in said resiliently deformable area, said plurality of beads comprising: a first pair of beads extending in a direction. forwardly and rearwardly of said seat cushion frame; and a second pair of beads extending in a direction forwardly and rearwardly of said seat cushion frame, wherein said first pair of beads as well as said second pair of beads are disposed on opposite sides of said center of said resiliently deformable area, and
  wherein said second pair of beads each has, defined therein,
    a first bead portion extending along a direction forwardly and rearwardly of said seat cushion frame, and
    a second bead portion disposed near to said center of said resiliently deformable area, and
  wherein the two second bead portions respectively of said second pair of beads extend away from each other relative to said center in a direction rearwardly of the seat cushion frame.

13. The seat cushion as claimed in claim 12, wherein a bead portion is defined so as to extend between said first set of bead portions in a direction transversely of said seat cushion frame.

14. The seat cushion as claimed in claim 12, wherein said resiliently deformable area further includes a hole formed in substantially said center thereof, and wherein said first pair of beads as well as said second pair of beads are disposed on the opposite sides of said hole.

15. The seat cushion as claimed in claim 12, wherein said bottom panel member has an upwardly facing surface and a downwardly facing surface opposite to said upwardly facing surface, wherein said first pair of beads are each of a substantially U-shape in cross-section, thus having a downward recession which opens outwardly in said upwardly facing surface of said bottom panel member, and wherein said second pair of beads are each of substantially "inverted U" shape in cross-section, thus having an upward recession which opens outwardly in said downwardly facing surface of said bottom panel member.

16. The seat cushion as claimed in claim 12, wherein said bottom panel member has an upwardly facing surface and a downwardly facing surface opposite to said upwardly facing surface, wherein said first pair of beads are each of a substantially U-shape in cross-section, thus having a downward recession which opens outwardly in said upwardly facing surface of said bottom panel member, and wherein said second pair of beads are each of substantially "inverted U" shape in cross-section, thus having an upward recession which opens outwardly in said downwardly facing surface of said bottom panel member, and wherein said resiliently deformable area is substantially surrounded by said first and second pairs of beads in relation to the center thereof.

17. The seat cushion according to claim 16, wherein said resiliently deformable area further includes a hole formed in substantially said center thereof, and wherein said first sets of bead portions as well as said second sets of bead portions are disposed on the opposite sides of said hole.

18. The seat cushion as claimed in claim 12, wherein a pair of inwardly curved edge portions are defined in two lateral sides of said buttocks support area, respectively, at a point where said resiliently deformable area lies, such that said buttocks support area becomes narrow at said point.

19. A seat cushion of vehicle seat, comprising:
- a seat cushion frame including: a first lateral frame member having: a forward frame portion defined forwardly of the seat cushion; and a rearward frame portion defined rearwardly of the seat cushion; and a second lateral frame member having: a forward frame portion defined forwardly of the seat cushion; and a rearward frame portion defined rearwardly of the seat cushion, wherein said first and second lateral frame members are spaced apart from each other; and
- a bottom panel member upon which a foam padding is to be mounted, said bottom panel member being so formed as to have: a thigh support area defined in a forward portion of said bottom panel member which is forward of the seat cushion, said thigh support area being adapted to support thigh portions of a seat occupant who is to sit on the seat cushion, and being fixedly welded to said forward frame portion of said first lateral frame member and said forward frame portion of said second lateral frame member; a buttocks support area defined in a rearward portion of said bottom panel member which is rearward of the seat cushion, said buttocks support area being adapted to support a buttocks portion of said seat occupant; and a rearward end area formed continuously from said buttocks support area, said rearward end area being fixedly connected with said rearward frame portion of said first lateral frame member and said rearward frame portion of second lateral frame member,
- wherein said buttocks support area is disposed between said rearward frame portion of said first lateral frame member and said rearward frame portion of said second lateral frame member, and further has a deformable area defined therein, said deformable area being provided with a bead element integrally therein to thereby allow said deformable area to be resiliently deformable and displaceable vertically relative to said seat cushion frame, and
- wherein said bottom panel member has an upwardly facing surface and a downwardly facing surface opposite to said upwardly facing surface, wherein said bead element comprises: a substantially U-shaped first bead of substantially "U" shape in cross-section, thus having a downward recession which opens outwardly in said upwardly facing surface of said bottom panel member; and a pair of spaced-apart second beads, each being of substantially "inverted U" shape in cross-section, thus having an upward recession which opens outwardly in said downwardly facing surface of said bottom panel member, and wherein said substantially U-shaped first bead is defined in said buttocks support area, such that said resiliently deformable area is substantially surrounded by the substantially U-shaped first bead.

20. The seat cushion as claimed in claim 19, wherein said bead element comprises a pair of beads, each having, defined therein, a first bead portion and a second bead portion, and wherein the two first bead portions respectively of said pair of beads extend along a direction forwardly and rearwardly of said seat cushion frame, whereas the two second bead portions respectively of said pair of beads extend away from each other in a direction rearwardly of said seat cushion frame.

* * * * *